United States Patent
Best et al.

(10) Patent No.: US 6,512,131 B1
(45) Date of Patent: Jan. 28, 2003

(54) PROCESS FOR CARRYING OUT MULTI-PHASE REACTIONS ACCORDING TO THE COUNTER CURRENT PRINCIPLE OF A LIQUID AND GASEOUS PHASE AND APPARATUS FOR CARRYING OUT THE PROCESS

(75) Inventors: Bernd Best, Mörfelden/Walldorf (DE); Karlheinz Brunner, Grosskrotzenburg (DE); Rainer Frische, Frankfurt (DE); Dirk Kilian, Maintal (DE); Joachim Seemann, Reinheim (DE)

(73) Assignee: Dr. Frische GmbH, Alzenau (DE)

( * ) Notice: Subject to any disclaimer, the term of this patent is extended or adjusted under 35 U.S.C. 154(b) by 202 days.

(21) Appl. No.: 09/694,405

(22) Filed: Oct. 22, 2000

(30) Foreign Application Priority Data

Oct. 29, 1999 (EP) .............................. 99121608

(51) Int. Cl.⁷ ............................................. C07C 51/34
(52) U.S. Cl. ...................................... 554/133; 554/132
(58) Field of Search .................................. 554/132, 133

(56) References Cited

U.S. PATENT DOCUMENTS 3,855,368 A    12/1974   Prochazka et al. ............. 261/81
4,185,025 A  * 1/1980    Carduck et al. ............... 260/406

FOREIGN PATENT DOCUMENTS

| CH | 507 734 A  | 5/1971 | .............. B01J/1/00 |
| DE | 20 38 860 A | 2/1972 | ............ B01D/3/00 |
| DE | 40 37 284 A | 5/1992 | ............ B01J/19/08 |
| EP | 0 631 809 A | 1/1995 | ............ B01F/11/00 |
| FR | 2 429 608 A | 1/1980 | ............ B01D/3/00 |
| FR | 2 743 508 A | 7/1997 | ........... B01D/57/00 |
| GB | 995 767 A  | 6/1965 | |

* cited by examiner

Primary Examiner—Deborah D. Carr
(74) Attorney, Agent, or Firm—Quarles & Brady LLP

(57) ABSTRACT

A process for carrying out a multi-phase reaction in a continuously operated tube reactor operated according to the counter current principle in which reactor components of a liquid phase flowing downwards as a thin film in said tube reactor and components of a continuous gas flowing upward in said tube reactor are brought to material transfer, or reaction respectively. The gas phase is pulsed, by repeated temporary pressure lowering at the gas entry into said tube reactor and/or repeated temporary pressure increase at the gas exit from said tube reactor, to counteract film thickness growth and liquid phase stagnation.

21 Claims, 4 Drawing Sheets

PROCESS FOR CARRYING OUT MULTI-PHASE REACTIONS ACCORDING TO THE COUNTER CURRENT PRINCIPLE OF A LIQUID AND GASEOUS PHASE AND APPARATUS FOR CARRYING OUT THE PROCESS

CROSS-REFERENCE TO RELATED APPLICATIONS

This application claims the priority benefit of European patent application EP 99 121 608.6 filed on October 29, 1999.

FIELD OF INVENTION

The present invention relates to a process and apparatus for carrying out a multi-phase reaction using the counter current principle of a liquid and a gaseous phase.

BACKGROUND

In chemistry, one is frequently confronted with the problem of carrying out multi-phase reactions in the form of separation processes, in particular chemical reactions in multi-phase systems. Decisive in these reactions is the phase transfer velocity of the components of the respective phases to be separated or reacted. The velocity of the reaction, as is generally known, can substantially be increased by enlarging the contact surfaces of the respective phases. Such enlargement can be achieved by intensively mixing the phases. Moreover, it is known that multi-phase reactions proceed particularly efficiently and rapidly, especially, if the process is continuously carried out in the counter current flow. However, when using the counter current principle, serious problems are encountered as will later be described so that the co-current principle is employed as well.

A special problem of multi-phase reaction is constituted by gas-liquid or gas-solid-phase reactions, particularly in the cases where gaseous components in a carrier gas are reacted with emulsified or suspended components in liquid phases. In view of the extremely great differences of the mass density of gases, on one side, and liquids, or solids, on the other side (at normal pressure, a ratio of about 1:1000 and more is found), giant gas volumes have to be brought into contact with relatively small, sometimes solid-containing, liquid volumes.

In gas-liquid multi-phase reactions, liquid mixtures are often brought into the reaction. The flow behavior of such mixtures, particularly when present in the form of emulsions, is extremely complicated. Surface phenomena, for instance, might lead to partial breaking of the emulsion. Different flow velocity reducing properties, such as, for example, differences of the viscosities of the liquids and/or differences in the adhesion of the liquids on the reactor surfaces might cause disturbances when carrying out the gas-liquid multi-phase reactions.

The complexity of gas-liquid multi-phase reactions and of the physical and chemical behavior of the respective components, particularly in the case of a heterogeneously combined liquid phase, is so high that forecasting the flow behavior thereof in reactors is practically impossible. It should for instance be noted that even in the case of two immiscible liquid phases, two types of emulsions might occur, namely phase 1 in phase 2 and phase 2 in phase 1. Flow behavior, viscosity, adhesion and other physical and chemical properties of the two emulsion types can show considerable differences so that in the case of chemical reaction, the flow behavior of the liquid phase in the reactor might change.

Known methods for increasing the efficiency and the velocity of reactions with or within phase mixtures are often employed. One method includes spraying the liquids (solutions, emulsions and suspensions) into the reaction gas. Another method (preferred in the present invention) includes carrying out of the reactions in tube reactors having built-in packings for enlarging the reaction surfaces.

When carrying out gas-liquid multi-phase reactions in tube reactors according to the counter-current principle, a running-down liquid in the form of a free falling liquid film, the so-called falling film, and an ascending gas phase flowing upwardly constitute the common practice. In that kind of reactor, the gas phase of both non-packed and packed reactors always constitutes a continuous phase and moves in good approximation in the form of a plug flow through the reactor. A significant fundamental problem is encountered in such reactors, particularly in the case of high flow velocities of one or of both phases, and thus, particularly, also in the case of a very large difference in volume flow rate of gas phase and liquid phase.

In the case of ozonolysis of unsaturated fatty acids as later discussed, for example, the velocity of the gas flow has to be adjusted to rates considerably exceeding the velocity of the liquid phase. The counter current flow of the gas quantities in opposite direction to the liquid decreases by friction forces the flow velocity of the liquid. As generally known, this might lead, particularly in the case of reactors having internals or built-in packings, to the generation of a self-generating flow barrier for the liquids in the reactor preventing disturbance-free operation of the reactor (the reactor "floods"). The limit of the respective gas or liquid velocity at which this phenomenon of flooding occurs, is also referred to as the flooding point. A stationary counter current process above the flooding point is not possible. Since it is necessary to operate below velocities at which flooding occurs, in many reactions, particularly in the case of ozonolysis, the possible reactor flow rates are too low.

In view of the above reasons, a reactor with co-current contact is frequently employed. In a co-current process with parallel flow, both the gaseous phase (carrier gas and gaseous reactive component) and the liquid phase flow in the same direction. In the case of stoichiometric use of the reactants and in view of the great density difference, a considerably larger volume flow for the gas as compared to the liquid, and hence a considerably higher flow velocity of the gas, has to be established. Friction forces cause an increase in the flow resistance at the interface between gas and liquid. Thereby it is possible to employ such built-in packings which increase the flow resistance thus reducing the flow velocity and enlarging the surface that would not be passed through by gas and liquids flow in a counter current process.

It is, however, a disadvantage of the co-current principle that considering the high flow velocity, the period of dwell of the gas and hence of the gaseous reactants in the reactor is relatively short. In co-current reactors, furthermore, an unfavorable distribution of temperature and concentration along the length of the reactor can be observed. When entering the reactor, both the liquid and the gas phase have high concentrations of the reactants. During the course of the process, however, the concentrations in both phases substantially decrease. In the case of exothermic reactions, for instance, this results in a high heat development, and thus a high material turnover at the entry of the components into the reactor, and in little heat development and thus in little turnover at the reactor exit. In order to nevertheless obtain a complete turnover, a plurality of co-current reactors are e.g. provided in cross flow arrangement to approximate the counter current principle.

In a counter current process, however, the turnover of the product is inherently uniformly distributed along the reactor length. By this kind of process technique, it is much easier to obtain complete turnover of the reactants. Likewise process control of exothermic reactions can be carried out in a considerably easier manner. One example of a gas-liquid multi-phase reaction known for a long time and carried out on an industrial scale where the above mentioned problems come up, is the above-referenced ozonolysis of unsaturated organic compounds with ozone in oxygen or air and subsequent oxidative cleavage of the ozonides generated in ozonolysis with oxygen or air. The oxidative cleavage of oleic acid by means of ozone and oxygen represents an industrially very significant application of this technique. Oleic acid is first reacted to the oleic acid ozonide in the presence of pelargonic acid and water with an ozone/oxygen mixture, or an ozone/air mixture. The reaction is carried out in a reaction column including, if need be, built-in packings. The resulting ozonide is subsequently cleaved, or further oxidized, respectively, in a second reactor to obtain the corresponding carboxylic acids.

Although the chemical principle of the reaction is rather simple and has been known for a long time, the technical implementation, for the reasons already mentioned, is rather sophisticated. It concerns a system wherein two immiscible liquids, water and organic acid, with oxygen as a gas, have to be reacted at substantial differences of the flow volumes of gas and liquids. The resulting oleic acid ozonide has substantially different physical and chemical properties (for instance regarding adhesive power, viscosity, solubility, polarity, melting point, emulsifying properties) compared to oleic acid. It is, inter alia, for this reason that in technical ozonolysis the oleic acid is added with a non-reacting second fatty acid, namely pelargonic acid. After the reaction of the oleic acid to ozonide, the pelargonic acid serves additionally as a solvent for the ozonide. In order to eliminate the reaction heat, water is added. The reaction is carried out so that the heat of the reaction is absorbed, on one hand, by the heat capacity of the reaction solution including water, and on the other hand primarily by evaporation energy which is removed from the reaction mixture by the evaporation of the liquid phase and particularly of the water of the through-flowing, originally dry, gas until steam saturation is reached.

The above mentioned cross current reactor arrangement comprising a plurality of co-current operated tube reactors was developed for ozonolysis of oleic acid. If ozonolysis is carried out in a reactor operating in accordance with the counter current principle, the latter is operated with small flow velocities of the phases and, in order to obtain any considerable material turnover, the reactor has, therefore, a correspondingly large volume, or large dimensions.

In addition to the above, gas-liquid reactions are also possible in bubble column reactors. In such reactors, a continuous liquid phase fills the major portion of the reactor volume in the form of a liquid column fed, for example, from the top, and a discontinuous gas phase in the form of bubbles is fed from the bottom through the aliquid column. In order to achieve a stoichiometric reaction, critical multi-phase reactions require relatively large gas volumes. The large gas volumes cause unacceptably long dwelling times of the liquid in the bubble column reactor. If, as is the case in the above ozonolysis of unsaturated fatty acids, the reaction product is explosive, this kind of reactor has to be ruled out alone for safety reasons.

Bubble column reactors, in addition, cause the problem that along the length of the reactor, the gas bubbles combine to form enlarged gas bubbles so that the reaction turnover decreases towards the reactor head. In order to solve this problem, it has been known from CH 507,734 A to provide a multi-stage bubble column by interrupting the bubble column by fine-pored gas barriers. The reactor interior then includes a plurality of bubble columns arranged one after the other. A gas inlet valve at the reactor bottom is synchronously or alternately switched on and off by means of a gas outlet valve at the reactor head. The same applies to the liquid valves at the upper and the lower ends of the reactor. The ascending gas bubbles collect and combine beneath the gas barriers to generate gas paddings which are pressed by periodically generated pressure impacts through the gas barriers above them in order to re-disperse the gas phase. The pressure impacts of the gas from below and of the liquid from above which act on the column contents are generated, in addition to a series of alternative measures, by alternatingly opening and closing the two control valves for the gas phase and the two control valves for the liquid phase.

BRIEF SUMMARY OF THE INVENTION

It is an object of the present invention to provide a process allowing improved execution of multi-phase reactions according to the counter current principle also in the case of the above-mentioned critical phase combinations. Another object is to provide an apparatus for carrying out the process. The objects are solved by the subject matters of independent method and apparatus claim, respectively. Advantageous further developments are defined in subclaims.

The invention is directed to a process for carrying out a multi-phase reaction in a continuously operated counter current tube reactor in contrast to reactors operated in batch mode. Hence, modulations or short interruptions of input of gas and liquid phase into the reactor are possible in the invention.

Surprisingly, the inventors discovered a process for uninterruptedly operating a counter current tube reactor with a liquid phase running down as a flow film and a continuous gas phase flowing up at extraordinarily high phase velocities of the gas and liquid phase by pulsating the gas phase. In spite of the high velocities of the continuous, pulsating gas phase and of the continuously-fed liquid phase, stable reactor operation showing excellent reaction results and turnovers can be obtained in the reactor, whether with or without built-in packings. Corresponding results can otherwise be obtained only in parallel-flow reactors having for instance a much larger cross section and longer reaction times. In addition, by means of the pulsing of the continuous gas phase according to the present invention, the flooding point can obviously be raised.

The gas phase can be pulsated by repeated temporary lowering of pressure at the gas inlet to effectively counteract liquid phase stagnation and flow film thickness increase. Pulsating the gas phase can also be accomplished alternatively or additionally by a pressure increase at the gas discharge from the tube reactor.

In a reactor having no built-in packings in which high phase velocities cause stagnation points or flow barrier points, the inventive measure can avoid repeated increase of the flow film of the liquid phase on the tube wall up to a range of values unacceptable and even critical for the reaction (values at which, in extreme cases, collapsing or crashing down of the flow film within the reactor tube results). The novel gas phase pulsation induces a repeated increase and decrease of the flow film thickness and, thereby, an increase of the flow film surface and of the reaction face, occur along the length of the tube. The flow film surface takes a wave-like profile where the liquid phase in the flow film is advantageously shifted and displaced in itself and thereby different liquid phase areas in the film profile get into contact with the gas phase. Advantageously, the repeated increase of the gas phase pressure prevents a decrease of the flow film to too low values.

By the temporary pressure decrease in the gas phase from below (and/or pressure increase from above, respectively), the counter flow movement in the gas phase is temporarily interrupted so that the gas phase comes at least to a standstill. In accordance with the invention, however, it is preferred that the flow direction of the gas phase is temporarily reversed. It is surprising that by doing so the stable, continuous operation of the reactor is not disturbed, rather the reaction process is evidently promoted. One reason may be that the gas phase by means of its stroke movement may come into reaction with the liquid phase over longer contact times and increased phase exchange faces. Such positive effect of the increase of the reaction turnover, however, cannot be obtained by merely switching on and off the gas supply through a valve.

Moreover, a further increase of the turnover of the reaction can be obtained by not only decreasing the gas phase pressure in a repeated manner for a certain period of time but rather periodically increasing and decreasing the gas phase such that the pulsed gas pressure causes an oscillation or vibration of the gas phase in the tube reactor. The generated gas oscillation induces a periodic movement of the gas phase opposite to the given counter current direction and promotes the reaction process.

The liquid phase is also advantageously intermixed by turbulence generated by the repeated, preferably periodic, gas stroke. This leads to an increase of the material turnover potential per reaction volume. In addition, even in the case of extremely fine-meshed structures, areas clogged by the liquid are cleared by the gas pulsation. Therefore, in accordance with the invention, tightly packed fine-meshed structures can be provided in the counter current reactor.

A particular advantage of the present invention consists in that operation is possible at a very high gas flow velocity, which is of decisive advantage for chemical reactions requiring stoichiometric ratios, such as the two-step oxidative ozonolysis of unsaturated fatty acids. In view of the improved turnover rate, operation at high volume flow rates and very high ozone concentrations can be achieved. The water addition can be increased within large limits without any narrow restriction by the other components of the liquid phase.

In accordance with a preferred embodiment of the present invention, liquid phase stagnations are avoided. In any case, the pressure of the gas phase will always be temporarily changed and pulsed at least, whenever liquid phase stagnation or unacceptable increase of flow film thickness occur. The temporary pressure change can be adjusted to provide a pressure decrease below the location of stagnation and decrease the gas phase velocity to allow the stagnating liquid phase to dissipate and reduce the flow film thickness to a desired value. In this way, the reactor can have, if desired, local stagnations for short periods of time while the operation thereof does not become discontinuous. In other words, the well-known phenomenon of flooding in packed gas-liquid reactors with continuous gas phase and a free-falling liquid film can be overcome by the present invention. The flow characteristics of the two phases can approximately be considered as plug flows.

The periodic vibrations of the gas conducted in the counter flow induce, also in the liquid phase and vis-a-vis the gas itself, a substantially better mixing than in the case of a counter current process without periodic vibration. The introduction of periodic vibration has already been employed in liquid-liquid counter current percolators. The two phases in these percolators, however, vibrate inevitably in-phase. This does not hold true in gas-liquid multi-phase reactors, and the flow situations are not comparable.

BRIEF DESCRIPTION OF THE FIGURES

FIG. 2a shows the pressure changing device of FIG. 2;

DETAILED DESCRIPTION OF THE INVENTION

Figure 1:
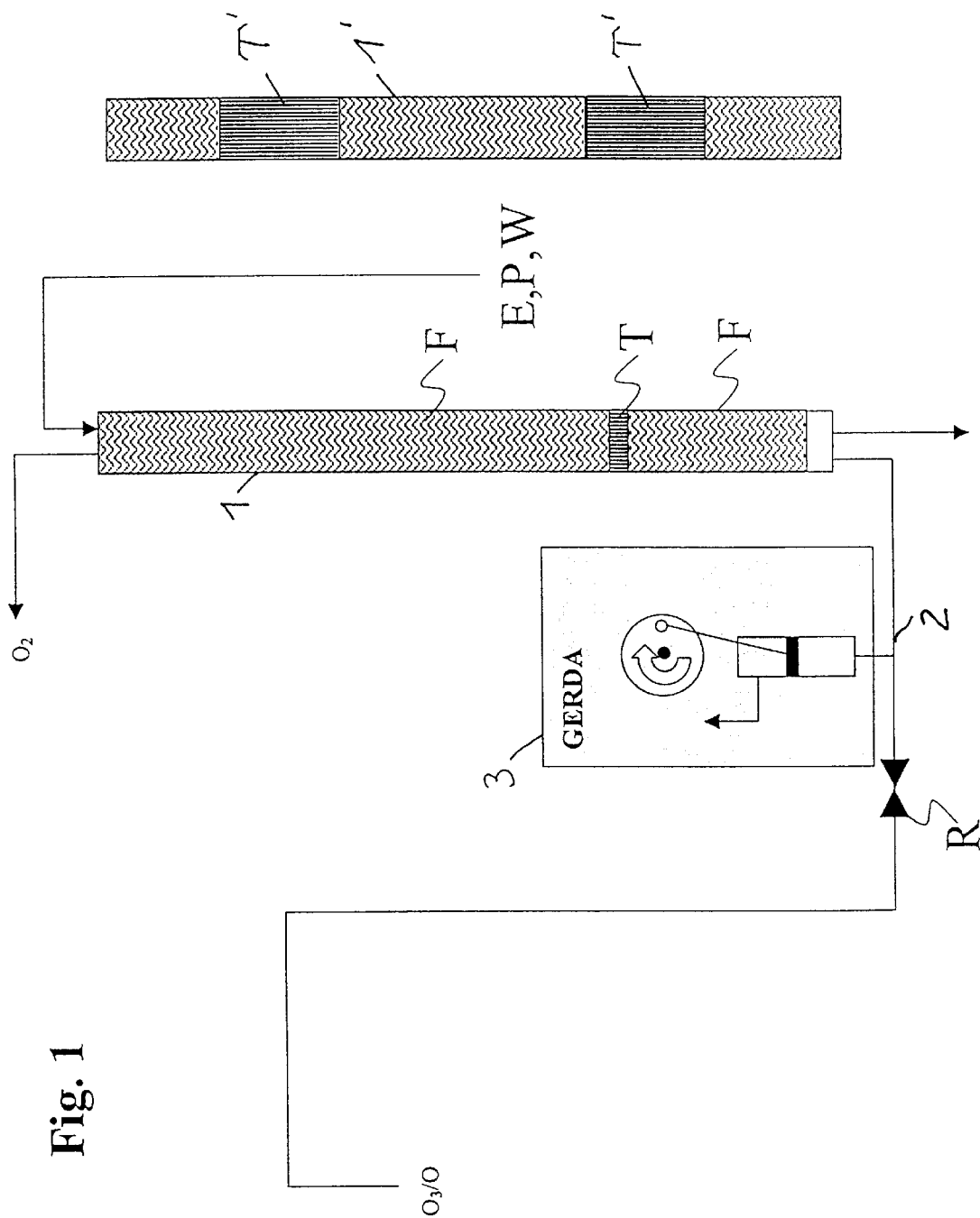
FIG. 1 shows a diagrammatic view of a laboratory apparatus for testing the process of the invention.

The principle of the process of the present invention will representatively be explained based on the example of the reaction of unsaturated native fatty acids to ozonides. This case stands for gas-liquid reactions of a counter current process, wherein a carrier gas includes a gaseous reactant to be reacted with a reactant solved in a liquid in the presence of a second immiscible liquid used as an auxiliary component. The invention is, however, also advantageously applicable to other chemical reactions, particularly to reactions of the critical mixed phases referred to. Separation operations such as the removal of ammonia or $SO_2$ from flue gas as gas phase with water or an acid as the liquid phase can be considered as well as such multi-phase reactions. The invention is also applicable to the oxidative cleavage of ozonides following ozonolysis of unsaturated fatty acids.

Unsaturated native fatty acids, such as oleic acid, erucic acid, and the like, can be reacted with ozone to the corresponding ozonides. In this reaction, the ozone is generated, in Siemens generators, from oxygen or air and is reacted as a gas mixture with the unsaturated fatty acids. The concentration of the ozone in this case, depending on the process, amounts from about a few percent to maximum 15%.

The liquid (for instance oleic acid) or solid (for instance erucic acid) unsaturated fatty acids to be reacted are dissolved in a solvent (for instance pelargonic acid) not participating in the reaction, and are mixed with water as heat absorbing and heat removal medium. The gas mixture of ozone and oxygen, or air, respectively, flows in a counter current flow towards this liquid phase in the tube reactor. The ratio of ozone to unsaturated fatty acid is chosen so that a stoichiometric reaction between ozone and double bond of the fatty acid can take place. Excess $O_3$ can be added to compensate for the ozone loss by decay of ozone depending on temperature, air, dwelling time and further physical and chemical parameters (such as for instance catalytic activity, polarity of the free surfaces, and the like).

The amount and the temperature of water being added and the volume flow of the gas being fed in counter current flow and the gas temperature are chosen so that the temperature of the reactor remains constant in the desired temperature range. The water absorbs according to its heat capacity part of the heat, on one hand, and, on the other hand, causes heat dissipation according to the energy required for evaporation of water up to vapor saturation of the gas. Accordingly, the heat removal is also achieved by the gas which flows in the counter current and which on entering into the column is first cool and dry.

This above method of thermodynamically controlling the temperature of the reactor by means of the auxiliary liquid compound water has already been used for a long time in production technology. When carrying out a counter current reaction, however, the changed parameters can only be controlled within narrow boundaries. With increasing flow velocity of the gas (air, or oxygen with ozone, respectively) in the counter current flow and by tighter packing of the reactor columns to improve the phase exchange between the gas and the liquid phase, the flow velocity of the liquid phase is soon so far reduced that it stagnates in the reaction tube, or reverses its flow direction.

If the ozone-oxygen mixture is permitted to pulse in the counter current flow as in accordance with the invention, the liquid phase is decelerated and reduced in through-flow as well. With an identical gas amount over time (charge of gas weight per unit of time), such through-flow reducing effect, however, is notably smaller than in the case of a uniform gas flow.

The repeated temporary or periodic pressure changes in the gas phase and hence the changes of the flow velocity of the gas in the liquid phase induce an increase and decrease of the thickness of the flow film in the reactor tube. Without reversing the flow direction of the gas phase, the thickness increase of the flow film induced by the counter current gas flow is restricted to a maximum value resulting from the liquid supply to the reactor. The velocity at which the increased flow film thickness can decrease, depends mainly on the internal friction of the liquid phase (viscosity) and the friction force between the gas and the liquid phase.

The process taking place when changing velocity of the counter current gas flow can be subdivided into two time phases: during one time phase, at increased counter current velocity of the gas, a more and more increasing film thickness arises caused by the friction resistance with the surface of the liquid phase, and corresponding to the inflow of the liquid phase. During the other time phase, the film thickness can then be rapidly decreased in the flow direction of the liquid phase at reduced counter current velocity of the gas. As a result the feeding force which acts in the flow direction of the liquid phase remains.

In the process of the invention, the material flow of the liquid phase in the counter current reactor corresponds to the characteristics of a reaction conducted in parallel flow integrated over the period of the reaction, regarding to the through-flowing amount, However, as to the phase transfer phenomena and the chemical reaction, the process of the present invention exhibits the characteristics of a reaction carried out in counter current.

Even if the material flows fed to the tube reactor operated in counter current are kept so small that no liquid phase stagnation could occur, the gas phase pulsation according to the invention can significantly increase the reaction turnover as compared to non-application of this feature and to enjoy the advantages shown such as operating with high ozone concentrations etc. In the empty-tube reactor, the described advantageous surface increase and the layer displacement of the flow film are obtained, and in a reactor filled with built-in packings and the like, the advantages already described in this connection are obtained. As compared to classically carried-out counter current reaction, in this case, too, a notably higher material flow rate at a given reactor geometry and a substantial enlargement of the interface between liquid and gas phase, and hence a significant increase of the interface crossover of the gaseous reaction component, can be obtained. Emulsions within the liquid phase, or emulsions formed during the course of the reaction, respectively, can be reacted substantially more effectively than without gas vibration. In this kind of process of the invention, moreover, the dead volumes or hold-up of the material flow in the reaction column normally causing substantial problems and of disadvantage particularly in the case of suspensions can be avoided. The decay of the emulsions is moreover successfully counteracted.

For carrying out the novel counter current gas-liquid reaction, it is preferred to employ cylindrical tube reactors since based on geometry of the latter, the principle of the invention can in an easy manner way be applied and optimized. The principle of the invention can be applied both to tube reactors without built-in packings increasing the flow resistance (thin-film tube reactors) and to tube reactors having built-in packings which increase the reaction interfaces and hence also the flow resistance thereby attenuating the gas vibrations of the invention. In this connection both uniformly packed columns and, preferably, variably-stacked packing can be provided which create zones of different flow resistance in the built-in packings inducing different flows of the phases. It is particularly in the latter case that the advantage of the counter current principle according to the invention becomes readily apparent.

All characteristics known to those skilled in the art, such as catalytic activity or polarity of the surfaces, electrostatics, transport phenomena, electronic effects, magnetic effects, field effects of the surfaces employed in the built-in packings for enlarging the surfaces, can be applied in the process according to the present invention. The built-in packings can for instance be massive or can be applied as coatings.

One skilled in the art is well in a position to adapt the amplitude and the frequency of the repeated changes of the pressure amplitude as well as of the induced pressure vibrations to the respective reactor geometry and the material properties (particularly the viscosities) of his system. For the characteristics of the vibrations, symmetric or asymmetric, sinusoidal, triangular, saw tooth, rect-angular, stepped, combined and/or overlapped vibration patterns having a plurality of frequencies and characteristics, overlapped vibrations for instance for the generation of an aimed liquid film rupture, are possible. Amplitude modulation of the given pressure vibration of a frequency higher than the frequency of the pressure vibration can also be generated.

The measures to be taken in the apparatus according to the invention in order to carry out the process of the invention can be made with little additional technical expense compared to common counter current reactors. In principle, a single pressure changing means having the form of a piston or a diaphragm in the area of the gas phase entry at the lower reactor end is sufficient by means of which the temporary pressure decreases are obtained. In this connection, it has proved to be advantageous to generate the pressure decrease in the lower reactor area, or the pressure increase in the upper reactor area, respectively, by means of a pressure-controlled oscillating or swinging liquid column as described herein.

Additional gas pressure changing means can also be provided along the tube reactor. A stagnated liquid phase can also be eliminated by means of a by-pass including a valve where, when opening the valve, a pressure balance of the gas phase above and below the induced flow barrier and the liquid is rapidly drained off. Finally, it is alternatively possible to temporarily increase the pressure from above in order to counteract liquid flow barriers and film thickness growths.

As compared to the cross current systems having at least two parallel flow reactors arranged in cross current, a single counter current tube reactor of the invention can be designed shorter yet nevertheless yields a better turnover. As compared to customarily operated counter current tube reactors, the reactor of the invention can be made substantially narrower yet yielding the same flow rate and material turnover.

The vibration of the gas phase generated according to the invention can advantageously be applied as well in reactors operated in parallel flow and in parallel flow reactors arranged in cross current. Particular advantages can in this connection be obtained when reacting suspensions tending to sedimentation as for instance in the case of catalytic hydrogenations with Raney nickel as the catalyst and hydrogen as gas.

EXAMPLES

Reaction of Unsaturated Native Fatty Acids to Ozonides

For reacting unsaturated native fatty acids to ozonides, a laboratory apparatus was designed. A shown in FIG. 1, the laboratory apparatus includes a reactor column 1 (Type I) having a length of 1.20 m and an internal diameter of approximately 0.040 m of glass elements, by Büchi AG, Switzerland, is filled with commercial filling bodies F, by Vereinigten-Füllkörper-Werke, which bodies are separated by a Teflon plate T 2 mm thick having five 5-mm bores.

At the head of the column, two sockets not identified in detail for feeding liquid (E, P, W) and for gas discharge ($O_2$) are provided. Below the packing, a T piece 2 made of glass is provided. A gas inlet leading to the gas source ($O_3/O_2$) via a non-return valve R is connected to a branch of the T piece 2. Downstream of T piece 2, a valve, not shown, for controlled discharge of the liquid is mounted.

Liquid supply is provided through a dosing pump, not shown, by ProMinent, Heidelberg, which draws the liquid from a supply container which can be tempered and which, by constant stirring, keeps it homogenized, or homogenous, respectively.

The gas supply consist of a Siemens generator, not shown either, for ozone generation, by Ozonial/Fischer Technology GmbH, operated in this case by pure oxygen. At a gas flow rate of 400 l/h and an adjusted generator power of 500 watts, an ozone-oxygen mixture results which contains about 11 vol. % ozone. In this way, a gas mixture containing about 54 g ozone is generated per hour. The ozone-oxygen mixture is fed via the non-return valve from below into reactor column F. Between non-return valve R and the reactor, there is connected, via T piece 2, an apparatus 3 for generating pressure changes in the gas flow (GERDA). In the simplest case, this can be provided as an expansion tank the volume of which can mechanically be varied. In the embodiment of the present example, a piston was installed after original experiments with such a tank.

A liquid mixture of erucic acid (E), pelargonic acid (P) and water (W) having the composition

| Erucic acid (94%) | (E) | $C_{22}H_{42}O_2$ | 12.5% by weight |
| Pelargonic acid | (P) | $C_9H_{18}O_2$ | 12.5% by weight |
| Water | (W) | $H_2O$ | 75.0% by weight | is provided under constant stirring in a mixing vessel, not shown. Another composition used was: oleic acid (92%), $C_{18}H_{34}O_2$, 10% by weight, pelargonic acid, $C_9H_{18}O_2$, 10% by weight, and water 80% by weight.

The liquid mixture is added from above by means of the dosing pump into the packed reactor column (of Type I). Below the packing, an ozone-oxygen mixture is fed as shown in counter current flow. The ozone reacts with the erucic acid dissolved in the pelargonic acid while dissipating heat to yield an erucic acid ozonide. The ozone does not, or only very minutely, react with water or the pelargonic acid. Part of the ozone (about 5% to 20% depending on temperature), however, decays between generation and discharge from the reactor.

The material flows of the dissolved erucic acid and of the ozone as well as those of the respective accompanying substances (pelargonic acid, water, oxygen) are adjusted so that a stoichiometric turnover of erucic acid and ozone to erucic acid ozonide can take place. The portion of the decaying ozone is fed in excess thus compensating for the ozone portion not available for reaction.

At the beginning of the process, apparatus 3 remained switched off. With a transport capacity of 2600 g/h of liquid mixture (E, P, W) and a volume flow of 400 l/h of gas mixture (ozone/oxygen) in counter current flow, a flow barrier of the added liquid mixture is built up at Teflon insert T a short time (about 5 minutes) after the ozone addition reaction has started. The level of the barrier increases and leads to a critical state in which operation of this reactor becomes impossible. The reactor fills with liquid which cannot flow off since more liquid is fed from above than can flow off through the Teflon disc. This draining problem restricts in normal operation the flow rate for this size and design of the reactor.

In accordance with the present invention, prior to the flow barrier building up and reaching the critical state, apparatus 3 is switched on so that the flow barrier can be avoided, or if formed, eliminated. Once the apparatus is switched on, the reactor permits a higher product flow. Advantageously, by providing pulsed pressure changes and hence changes of the flow velocity of the gas, flow barriers are avoided, thus permitting operation of this reactor with such large material amounts as mentioned. The material turnover to ozonide was in this case complete (>99%).

Without the pulsed pressure changes, even when decelerating the liquid dosing pump to the lowest power of less than 1000 g/h and correspondingly reducing the gas flow to less than 200 l/h, no continuous reactor operation could be obtained. As before, a flow barrier was building up. In addition, a sample of the reaction solution at the reactor outlet revealed that there was no complete reaction. Only when drastically lowering to still smaller values (300 g/h liquid and 50 l/h gas) both of the gas and the liquid, longer operation without flow barrier effect became possible, with correspondingly low material turnover and less complete reaction though.

In addition to reactor 1, type I, an alternative reactor 1' (Type II) shown to the right reactor 1 of FIG. 1 was tested in which two thicker Teflon discs T' were arranged between the fill material. Finally, the reactor tube was exchanged against a somewhat longer one and provided with up to five discs T and filled between these discs with different packed columns, namely alternately with very fine-meshed packing bodies in form of windings of wire netting and coarser fills of statistically distributed individual packings retained by the discs.

Pressure and velocity of the gas phase of the differently-filled reactors were in most various ways both lowered, only temporarily and repeatedly at large material flows, as well as periodically raised and lowered so that noticeable vibration occurred in the transparent reaction tube. In this way, the reactor could with success be continuously operated at the large material flows mentioned if, at least at the beginning of a liquid phase stagnation, the gas pressure was always temporarily lowered so that the stagnated liquid phase column having a maximum height of a few cm flew off.

This mode of operation can be automated in that a liquid phase stagnation is monitored and is compensated by temporary pressure decrease before the reactor is brought again to the high gas pressure. In the reaction tube shown completely filled with built-in packings, stagnation comes up at different times and at different locations in the reactor tube and can, by the propagation of the pressure change over the column, be removed at one location and avoided at an other. In the case of large material flows, the frequency of stagnation formation is already so high that pressure changes are necessary at a rate of a few seconds any way so that even in the case of a pressure change not strictly periodic in the sense of the word, pulsing of the gas phase occurs. With large material flows, a periodic pressure pulsation was provided with a period between about 0.5 and 5 s.

Discs T, and T', respectively, provided between the different packings in the column have large holes of approximately 5 mm diameter so that they do not interrupt the continuous gas phase. Using the discs, channel formation of the liquid phase in the different packings could be avoided by redistribution of the liquid flow. While discs T, T' in addition to the packings and fills constitute further stagnation locations for the liquid, liquid stagnations at the discs can be avoided or, at least minimized, with the present invention.

By compression and relaxation of a pressure vessel, not shown, temporary or periodic pressure increases and decreases are generated in the reactor column thereby generating pressure vibrations. By these pressure strokes, preferably applied periodically, the reaction could be farther improved. This measure leads also to a significant success regarding the chemical material reaction if the material flows were decreased to the low values referred to, and if without pressure vibrations practically no liquid flow barrier occurred. In practice, however, the amount of the material flows will not be restricted. As shown by the present invention that flows can be notably increased, and of course, constitute the base for a significant material reaction increase while the reactor geometry remains the same, provided that the large material flows can really be brought to reaction, which as demonstrated is promoted by the present invention.

The amplitude of the generated gas stroke does not seem to be critical relative to the attenuating effect of the built-in packings on the two phases. The stroke should not, of course, be so high that the liquid phase is pressed too far upward. Since this depends on numerous factors, and not only on the amplitude of the predetermined pressure vibration, a generally valid limit value cannot be given. However, preferably the pressure strokes induced in the reactor column are limited to about one third of the length thereof or better of the reactor volume, respectively.

Figure 2:
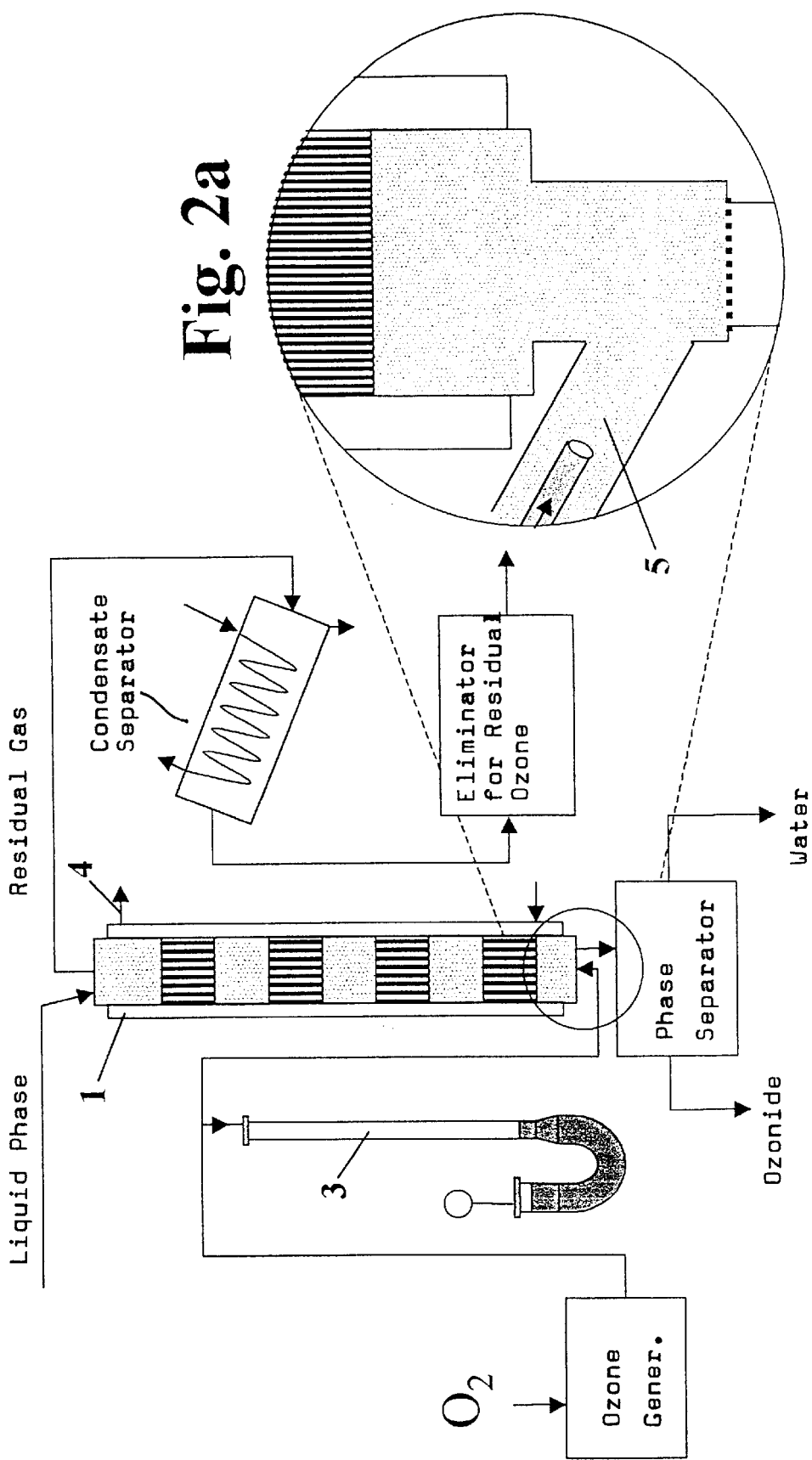
FIG. 2 shows a larger plant having a modified pressure changing device and gas phase supply means

Based on the test on the laboratory apparatus according to FIG. 1, a larger plant according to FIG. 2 having a length of 2.20 m and a reactor internal diameter of 100 mm was designed.

In spite of the considerable length and complete filling of the reactor with packings, propagation of the temporary pressure decrease of the gas phase generated at the gas feed could be observed in the whole tube. This is surprising because the gas mixture being discharged at the head of the reactor exhibits a free through-flowing passage through the reactors of FIGS. 1 and 2 where it flows freely out of the reactor into a drain for residual gas.

As shown in FIG. 2, the reactor contains four windings of wire netting having a length of 300 mm and being indicated by means of vertical hatching. As in the reactor of FIG. 1, Teflon disks (not shown) having approximately thirty to forty bores with a diameter of approximately 6 mm are placed upon each winding. Packing elements Interpak 10 of Vereinigten-Füllkörperwerke are filled in up to a height of about 200 mm upon the disks such that these filled in packing elements and windings are alternately arranged as shown in FIG. 2. The residual gas is supplied to a condensate separator means (DN70 of Büchi AG, Switzerland) where it is dried and thereafter to an eliminator for residual ozone (COD 10 of Wedeco, Herford). The liquid phase discharged from the reactor is separated into ozonide and water in a phase separator. An ozone generator (SOM7 of Wedeco, Herford) supplies ozone into the lower region of the reactor via an obliquely attached connecting piece 5 (FIG. 2a) which leads into a reactor space filled with packing material. By means of this construction, the safety is increased because the discharge of the liquid phase is separated from the location of ozone supply. Preferably, the reactor is surrounded by a heatable water jacket 4, and a temperature of about 35° C. is maintained to promote the reaction.

Figure 3:
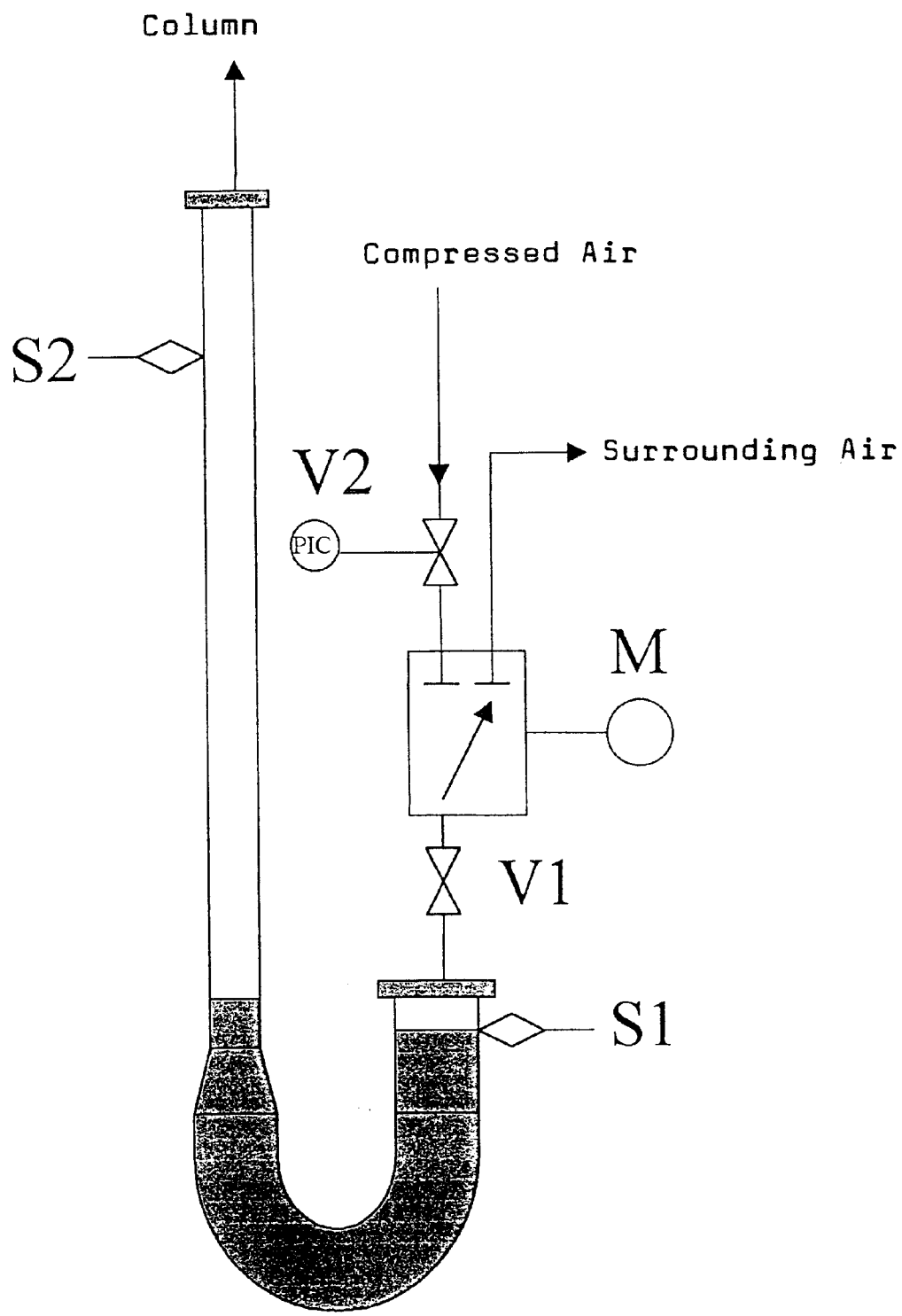
FIG. 3 shows a first embodiment of the pressure changing device.

As shown in FIGS. 2, 2A, and 3, the device 3 for generating pressure changes of the present embodiment consists of a communicating tube, in which a pressure pulsation is generated by means of an oscillating liquid column. The U-shaped tube of this device 3 is partly filled with a liquid, such as water, and is in fluid communication with the ozone supply line at the upper end of the longer leg of the tube. Both legs are equipped with sensor means S1, S2 for detecting the arrival of the respective liquid level at the respective sensor position. Sensor S1 controls a 3/2-way solenoid valve M such that valve M connects to a source (not shown) for compressed air which is supplied via a valve V2. This valve is a regulated valve in order to adjust the velocity of the compressed air flow which moves the water column from S1 to S2. A valve V1 is provided between solenoid valve M and the gas space in the shorter right hand leg of U-shaped tube serving as shutoff and safety valve. In the water level position shown in FIG. 3 compressed air is supplied via valves V2, M and V1 into the gas space in the right hand leg of the U-shaped tube. The compressed air supply is switched off and the gas in the right hand leg of the U-shaped tube is opened to surrounding air when the water level reaches sensor S2. The water column in response thereto oscillates back into the original position whereby a corresponding pressure drop is induced in the gas phase which is, apart from this superimposed pressure pulsation, supplied at a constant flow rate. As soon as sensor S1 responds a new pressure built-up is initiated.

In an embodiment of the novel method, a difference volume of 0.8 to 0.9 l water column was moved as stroke volume in order to generate the pulsation of the gas phase in the reactor column 1. Forty strokes per minute have been generated (according to a stroke frequency of 0.67 Hz). The pressure built-up period was set to about 1 s and the relative short suction-stroke period was 0.4 s. Hence, about 6% of the clear inside volume of the reactor was moved as stroke volume in the oscillating liquid column. In the reactor with dense packing and the reaction mixture of the liquid phase, a stable operation of the reactor can be achieved over a wide range of throughputs of liquid and gas phase.

The flow rate of the liquid phase can be increased up to 50 l/h at a flow rate of the gas phase of 3 m$^3$/h and, at a flow rate of the gas phase of 4.5 m$^3$/h, up to 20 l/h. However, when deactivating pressure pulsating apparatus 3, stagnations of the liquid phase occurred at 5 l/h flow rate of the liquid phase and at a flow rate of the gas phase of 1 m$^3$/h. At 10 l/h flow rate of the liquid phase and at a flow rate of the gas phase of 1 m$^3$/h flooding occurred within a short time period.

As the above constructional and operational parameter of the reactor mutually influence one another no generally valid limits can be given for an optimum stroke volume and said other parameters. However, Those skilled in the art can determine without undue experimentation the stroke timing and stroke volume at which optimum throughputs for liquid and gas phase can be achieved for a particular reactor and a desired reaction mixture. For this purpose, those parameters are determined at which the reactor starts flooding.

An oscillating liquid column (water column) with a relative short suction-stroke period has been proved appropriate for carrying out the invention because of the easy implementation and the possible large stroke volumes.

Generally, it is advantageous for carrying out the invention to adjust the alternating suction-stroke periods and pressure built-up periods so that the suction-stroke periods are shorter than the pressure built-up periods. This allows the desired reversed flow direction of the gas phase within a short time interval during the suction-stroke period at the gas inlet into the reactor. As already outlined above, this measure substantially promotes a stable operation without liquid barriers. Furthermore, it is advantageous to use considerably large stroke volumes in the suction-stroke period corresponding to at least several percent of the clear inside volume of the reactor in the present embodiment, whereas too large stroke volumes are inappropriate as already outlined above. Those skilled in the art will appreciate that an optimum value will of course depend upon the above mentioned parameters.

In addition to the measure of adjusting relatively short pressure decreasing periods in comparison to longer pressure built-up periods, an alternative method can be implemented in which pressure of the gas phase at the gas outlet from the tube reactor is repeatedly increased. In this case pressure increasing periods are shorter than the pressure decreasing period following each pressure increasing period. Furthermore, alternative pressure changing devices for generating the desired stroke volumes are devices using electronically controlled pistons, bellows and/or pump aggregates.

Figure 4:
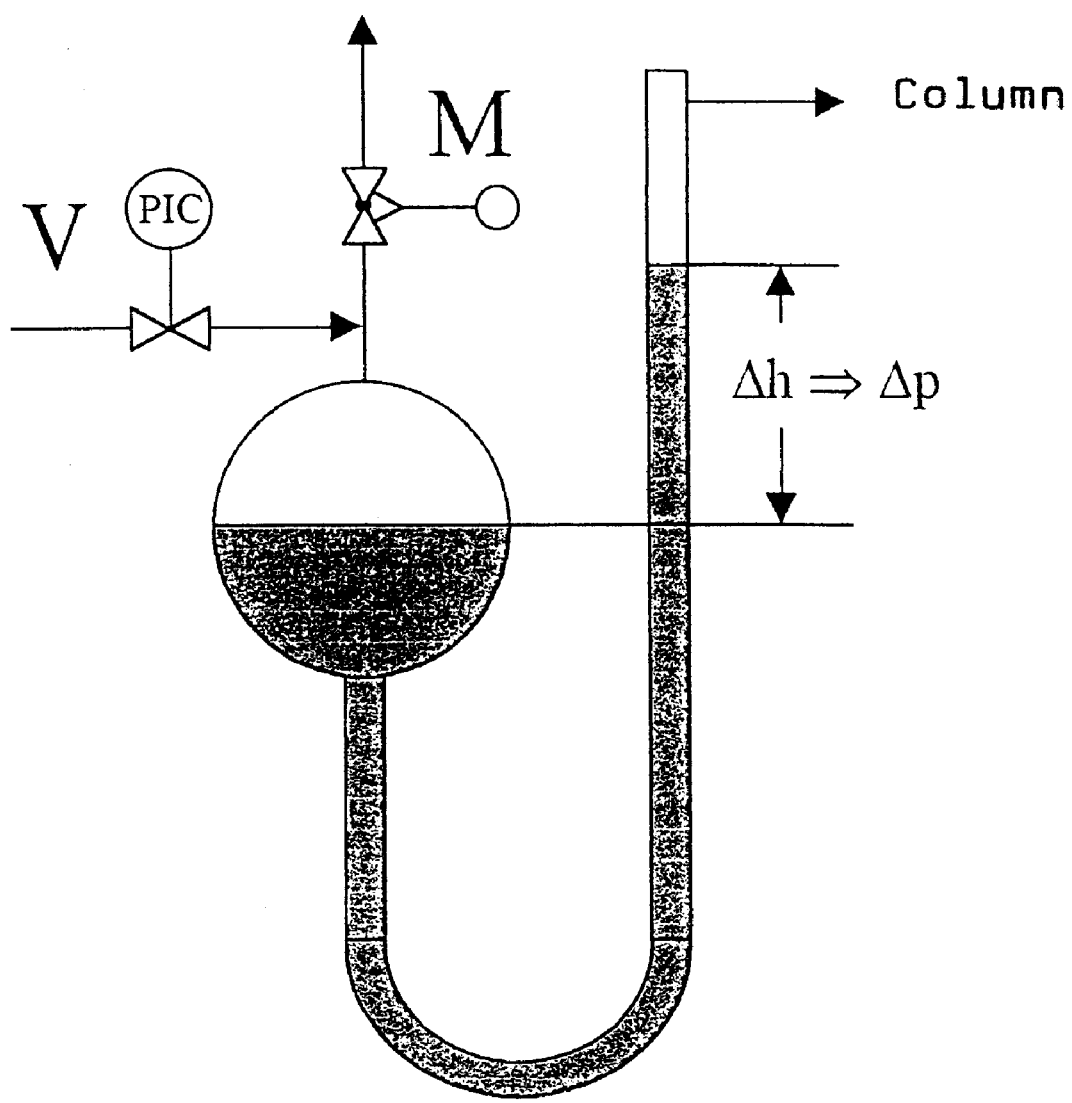
FIG. 4 shows a second embodiment of the pressure changing device.

FIG. 4 shows a modified embodiment of the oscillating liquid column. This embodiment comprises a supply container for the liquid (preferably water) being connected with a U-shaped tube which communicates with its longer right hand side leg to the gas supply into the reactor. Regulating valve V sets an optional inlet pressure from a source for compressed air (not shown). This pressure presets the stroke amplitude of the liquid column delta h. By opening solenoid valve M at predetermined intervals for variable periods it is possible to oscillate the liquid column with variable amplitude, frequency and oscillation pattern, thus inducing corresponding variable pressure pulsation in the gas supply into the reactor.

We claim:

1. A process for carrying out a multi-phase reaction in a counter current tube reactor wherein, in said tube reactor, components of a liquid phase flowing downward as a thin film and components of a continuous gas phase flowing upward in said tube reactor are brought to mass transfer, or reaction, respectively, characterized in that said gas phase is pulsed by repeated temporary lowering of pressure at the gas inlet into said tube reactor such as to counteract both thin film thickness growth and liquid phase stagnation.

2. The process according to claim 1, characterized in that said gas phase, alternatively or additionally to said lowering of pressure, is pulsed by repeated temporary increasing of pressure at the gas outlet from said tube reactor such as to counteract both thin film thickness growth and liquid phase stagnation.

3. The process according to claim 1, characterized in that said reactor is provided with built-in packings enlarging the reaction interfaces and that the reactor throughputs of liquid and gaseous phases are adjusted to such high values at which, without gas phase pulsation, liquid phase stagnation would occur at the built-in packings in the interior of said tube reactor.

4. The process according to claim 1, characterized in that said reactor is provided without built-in packings enlarging the reaction interfaces and that the reactor throughputs of liquid and gaseous phase are adjusted to a value at which the thin film thickness of the liquid phase would otherwise increase to a predetermined thickness absent pulsing the gas.

5. The process according to claim 4, characterized in that the pressure is temporarily changed at least whenever liquid phase stagnation begins to develop and said temporary pressure change is adjusted so that any stagnated liquid phase flows off caused by a resulting relative pressure decrease below the location of liquid flow barrier.

6. The process according to claim 4, characterized in that the pressure is temporarily changed when thin film thickness growth exceeding a predetermined thickness occurs and said temporary pressure change is adjusted so that the thin film thickness decreases to a desired value caused by a resulting temporary decrease of the gas phase velocity.

7. The process according to claim 1, characterized in that the gas phase is pulsed so that the upward movement of said gas phase is temporarily stopped.

8. The process according to claim 1, characterized in that the gas is pulsed so that the flowing direction of said gas phase is reversed so that said gas phase temporarily flows downwards.

9. The process according to claim 1, characterized in that the pressure of the gas phase is periodically pulsed so that pressure oscillation of the gas phase occurs in said tube reactor.

10. The process according to claim 9, characterized in that period and amplitude of said predetermined periodic pressure pulsation are alternatively adjusted at fixed or variable values.

11. The process according to claim 1, characterized in that the amplitude and time sequence of said pressure changes are adjusted in consideration of the material turnover in said tube reactor.

12. The process according to claim 11, characterized in that for taking into consideration the material turnover, the concentration of a reaction component of the gas phase discharged from the reactor and the degree of the reaction turnover are determined.

13. The process according to claim 1, characterized in that the liquid phase is selected from the group comprising mixtures of a plurality of liquids, liquid-liquid systems, emulsions, liquid-solid systems, suspensions containing an insoluble solid substance, and suspensions comprising a brine solution containing partially soluble solid material.

14. The process according to claim 1, characterized in that the multi-phase reaction is ozonolysis of unsaturated fatty acids.

15. The process according to claim 1, characterized by controlling said repeated temporary lowering of pressure of the gas phase at the gas entry into said tube reactor is effected in a manner controlled by at least one of a timer and a sensor.

16. The process according to claim 1, characterized by repeatedly temporary increasing pressure of the gas phase at the gas exit from said tube reactor in a manner controlled by at least one of a timer and a sensor.

17. The process according to claim 1, characterized in that said repeated temporary pressure lowering is effected by means of a pressure-controlled, oscillating liquid column.

18. The process according to claim 1, characterized by nonhomogeneously packing said tube reactor with at least one of packings, static mixing elements, and other structures suited for the respective reaction in order to obtain an enlarged reaction surface.

19. The process according to claim 18, characterized by providing carrier discs between said packings.

20. The process according to claim 1, characterized in that the gas is introduced into the tube reactor via a connecting piece which is attached to the side of said tube reactor in the lower reactor area and extends upwardly inclined and preferably leads into the reactor area already provided with built-in packings.

21. The process according to claim 1, characterized in that said repeatedly temporarily lowering of pressure of the gas phase at the gas entry into said tube reactor is effected such that the time periods for lowering pressure are shorter than the pressure built-up periods following each pressure lowering period.

* * * * *

UNITED STATES PATENT AND TRADEMARK OFFICE
CERTIFICATE OF CORRECTION

PATENT NO. : 6,512,131 B1
DATED : January 28, 2003
INVENTOR(S) : Best et al.

It is certified that error appears in the above-identified patent and that said Letters Patent is hereby corrected as shown below:

<u>Column 3,</u>
Line 64, "aliquid" should be -- liquid --

<u>Column 9,</u>
Line 52, "Ozonial/Fischer" should be -- Ozonia/Fischer --

<u>Column 11,</u>
Line 45, "farther" should be -- further --

Signed and Sealed this

Twenty-second Day of July, 2003

JAMES E. ROGAN
*Director of the United States Patent and Trademark Office*